Dec. 1, 1964     J. E. HODGSON     3,158,992
PROPULSION PROCESS USING PHOSPHORUS AND METALLIC FUEL
Filed Feb. 18, 1959
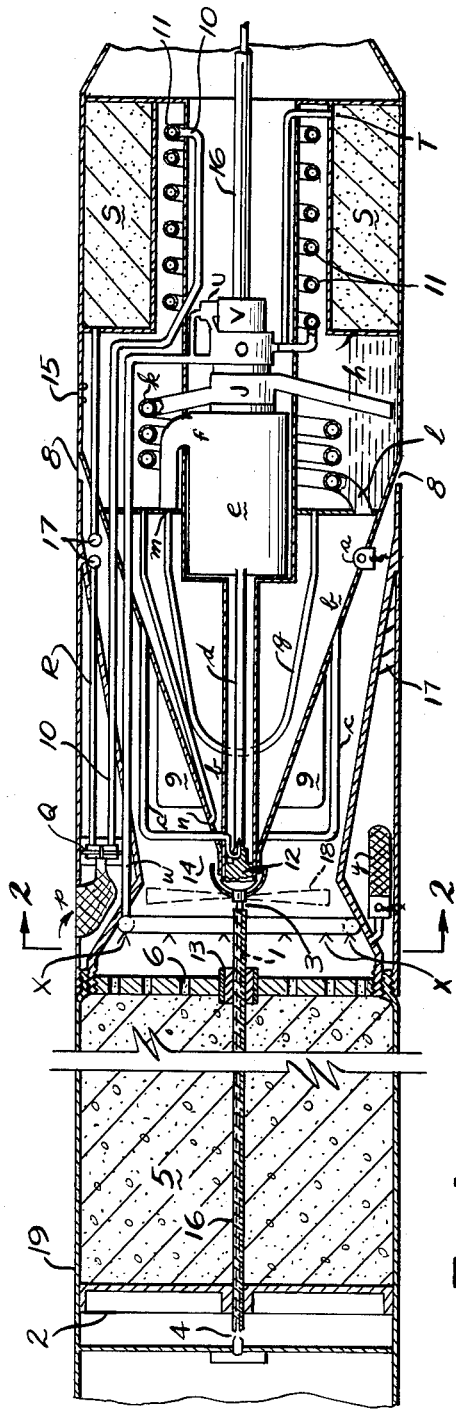
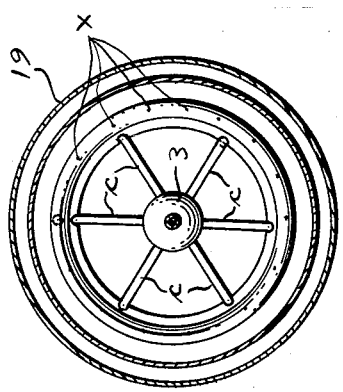
INVENTOR.
JAMES E. HODGSON
BY
*Meyer Baldwin Doran & Egan*
ATTORNEYS 3,158,992
PROPULSION PROCESS USING PHOSPHORUS
AND METALLIC FUEL
James E. Hodgson, Cleveland, Ohio, assignor to Solid Fuels Corporation, Cleveland, Ohio, a corporation of Ohio
Filed Feb. 18, 1959, Ser. No. 835,809
4 Claims. (Cl. 60—35.4)

The present invention is directed to combustion systems and combustion chambers in which oxidizers and fuels are introduced into or burned in situ in said chambers, either one or the other of said oxidizers and fuels being preferably liquid in form or extrudable for easy introduction into said chambers.

One of the advantages of the liquid-solid hybrid engine combustion systems and chambers is that solid fuels may be pressure injected or extruded with or without fusion into combustion chambers of hybrid engines for marine, airborne, space and nuclear applications.

The above extrusion of solid fuels into a combustion chamber applies to auxiliary power systems as well as to rocket, ram-jet, rocket-ramjet, nuclear rocket and nuclear ramjet engines.

The above method of providing energy comprises extruding a solid fuel into a combustion chamber for combustion therein with an injected oxidizer. This method can be employed in a torpedo or underwater missile engine system using principally gaseous hydrogen as the propulsive medium and whereby the gas is regeneratively cooled after passing through the power turbine or engine by the liquid oxidizer and the cooled exhaust products compressed and jettisoned overboard or if the propulsive media be condensable i.e. steam then, the water resulting is pumped overboard. This system results in an engine whose performance is independent of the depth.

In the present invention, the solid fuels that contain no oxidizer and can be burned with liquid oxidizers in hybrid engines are the following elements; lithium, beryllium, boron, aluminum, phosphorus in the form of their hydrides, carbides, borides, alloys thereof or the free metals themselves or lower energy elements such as silicon, titanium and titanium hydride bound with another element such as lithium or phosphorus.

The above mentioned reactive hydrides and metals or other mentioned solid fuels can be bound with all and any percentages of lithium and phosphorus for fusion and injection into a combustion chamber or burned in a combustion chamber in situ.

Using the combustion systems herein described, a fuel slug of powdered aluminum or phosphorus can be burned in situ with hydrogen peroxide for take-off and acceleration as a rocket engine. This engine can be converted to ramjet operation and at speeds above Mach 1.5 the above fuel slug is spontaneously combustible with ram air. Thus, the reaction above described with the fuel slug bound with lithium or phosphorus is suitable for propulsion of a one shot missile.

Some of the advantages of the above solid propellant engine systems including the above described fuel slug of powdered aluminum and lithium hydride bound with lithium or phosphorus is that high energy fuels can be safely carried in high density, non-volatile and non-hazardous (from the standpoint of fire and toxic vapor) forms. Also the slugs have the high stability of pure chemicals and metals and therefore there is no risk of internal reaction and oxidation at high temperatures.

Still another advantage is that, using the above fuel slugs in a hybrid engine, the engine system is the simplest, safest and most reliable engine while giving a very high exotic fuel performance that is fully controllable, safely ignited, and safely burned. In the hybrid engine, only one liquid phase such as the hydrogen peroxide has to be controlled. Another advantage is that a new range of solid oxidizers in solution may be burned with the fuel slugs and integrated oxidizer—fuel materials such as fluorinated hydrocarbons can be burned for the first time with high efficiency.

Thus, as previously indicated, the present invention includes a system of injecting by various means with or without fusion of the previously described solid and semi-solid fuel slugs into a combustion chamber for combustion therein with liquid oxidizers and fluorinating agents.

A system of pressure feeding solid or semi-solid fuel or propellants by gas pressure can be used for instance where cold high pressure gas is used behind a free piston or bellows, or where the gas is generated by decomposing a monopropellant such as hydrogen peroxide or ethylene oxide. Also, the fuel slug can be fed into the combustion chamber by a screw driven piston, the screw shaft of which may be driven by an auxiliary turbine or engine, an especially good means of feeding the fused or semi-solid fuel being a Moyno progressing cavity pump.

An example of a piston engine system MAUU (12B) (in which a fuel slug is fed into the combustion chamber of a torpedo or a missile) is shown in the drawings. In the above mentioned MAUU (12B) system, the torpedo or missile is launched and the firing mechanism electrically ignites the cartridge (a) which ejects a formerly sealed pellet of catalyst (a metallic permanganates or any hydrogen peroxide catalyst), into the hydrogen peroxide (which can be of any and all concentrations necessary to produce steam) in the annular steam raiser (b). The steam and oxygen evolved passes by direct and by the evaporator tubes (c) and the inlets and hollow drive shaft (d) into the power plant (e) where it rotates the power plant up to speed. The steam and oxygen pass out at (f) down the heat exchanger tubes (g) assisting in activating more hydrogen peroxide and to enter the annular condenser (h). The steam condenses in the liquid hydrogen peroxide (j) residual in the bottom of the annular condenser and the free oxygen escapes by the over pressure valve (m) and injected into the combustion chamber at (n) to aid initial combustion. The pump (o) rotated by the shaft, pumps the hydrogen peroxide and the condensing water (j) via the preheating exchanger (k) into the annular steam raising section (b) where it decomposes and repeats the cycle. When the engine (e) runs up to speed, the power shaft 16 also rotates the propellant pump (o) which by suction draws sea water in at the intake filter (p) and a proportioner valve with its actuator rod 14 cold and contracted diverts the main flow through tube (R) and the solid oxidizer basket (s) where it carries dissolved oxidizer to the pump (o) which since the speed control "by pass" valve (u) is closed by the governor (v) directs the full flow to the injectors (x) in the combustion chamber (z). The power shaft 16 also rotates (through a reduction gear (not shown) is necessary). The fuel-pressurizing hollow screw 1 which pressurizes the fuel 5 by means of the driven piston 2 and which is auto pressurized via the hollow shaft 1 via combustion chamber pressure inlet 3 and outlet 4 behind the piston 2. The fuel, such as the previously mentioned fuel slug comprising aluminum and litihum hydride particles in a phosphorus binder is pressed against the injection plate 6 for fusion and ignition if necessary by an electrically ignited solid starting cartridge or the hot oxygen gas from (n). (See the FIGS. showing MAUU (12B).) The injected fuel and oxidizer solution reacts and the products of combustion pass through the annular heat exchanger zone 7 and are ejected cold at the exhaust 8. The heat is exchanged to the steam raiser (b) through the metal vanes 9 and the multi steam tubes (c), the upper tubes being superheaters and the lower evaporators. The final heat is absorbed by the inlet water loop 17 to the annular oxidizer cell (s). When the oxidizer has a negative heat of solution, this preheating increases solubility and the negative heat of solution adds the condensing cycle. When the power plant is fully operational the proportional valve actuated by expanded rod 14 diverts the intake water through both the solid oxidizer loop and the dilution loop 10 which includes the condenser coils 11 before joining the oxidizer flow at the inlet to the pump (o). As previously indicated, the governor (v) and/or electrical command signals operate the by pass throttle valve (u) for speed and power control purposes.

In the above engine system, 70% hydrogen provides a very safe concentration for use in starting and is also safer for submarine transportation than higher concentrations. The above described hydrogen peroxide starting system can be used where hydrogen peroxide is put into closed or open cycle engine systems.

It is to be understood that further modifications of the present invention may be made without departing from the scope and spirit thereof.

Having described the invention, what is claimed is:

1. A method of providing energy for propulsion suitable for use in a combustion chamber of a rocket, ramjet and torpedo engine comprising the steps of introducing propellant ingredients comprising hydrogen peride and a fuel into said chamber in which the fuel is a solid slug of high energy fuel particles comprising aluminum particles and lithium hydride particles dispersed in a phosphorus binder, igniting said hydrogen peroxide and said fuel, and reacting the same to provide energy for propulsion.

2. A method of providing energy for propulsion suitable for use in a combustion chamber of a rocket, ramjet and torpedo engine said method comprising the steps of introducing hydrogen peroxide into the combustion chamber, said chamber containing therein a solid fuel slug of aluminum particles and lithium hydride particles dispersed in a phosphorus binder, igniting and reacting said hydrogen peroxide and said fuel slug to burn the fuel slug in situ to provide energy for propulsion.

3. A method for providing energy for propulsion suitable for use in a combustion chamber of a rocket, ramjet and torpedo engine comprising the steps of introducing hydrogen peroxide into a combustion chamber, extruding a normally solid fuel slug of high energy fuel particles comprising aluminum particles and lithium hydride particles dispersed in a phosphorus binder into said chamber, igniting said hydrogen peroxide and said fuel slug, and reacting the same to provide energy for propulsion.

4. A fuel slug comprising aluminum particles and lithium hydride particles dispersed within a binder of phosphorus, said slug being adapted for burning with hydrogen peroxide for take off as a rocket fuel and adapted to burn in air as a ram-jet fuel.

References Cited by the Examiner
UNITED STATES PATENTS

| | | | |
|---|---|---|---|
| 1,506,322 | 8/24 | O'Neill. | |
| 1,506,323 | 8/24 | O'Neill. | |
| 2,461,797 | 2/49 | Zwicky | 60—35.4 |
| 2,530,493 | 11/50 | Van Loenen. | |
| 2,696,708 | 12/54 | Kittredge | 60—35.4 |
| 2,698,511 | 1/55 | Britton | 60—35.4 |
| 2,771,739 | 11/56 | Malina et al. | 60—35.4 |
| 2,791,883 | 5/57 | Moore et al. | 149—87 |
| 2,858,672 | 11/58 | Clark | 60—39.46 |
| 2,935,844 | 5/60 | Parks et al. | 60—39.46 |
| 2,936,225 | 5/60 | Linsk et al. | 149—19 |
| 2,937,824 | 5/60 | Krumbholz et al. | 149—87 |
| 2,941,878 | 6/60 | Mahan et al. | 149—19 |

CARL D. QUARFORTH, *Primary Examiner.*

REUBEN EPSTEIN, OSCAR R. VERTIZ, ROGER L. CAMPBELL, LEON D. ROSDOL, *Examiners.*